United States Patent [19]
Henry

[11] 3,943,326
[45] Mar. 9, 1976

[54] TEMPERATURE CONTROL CIRCUIT FOR A HAND HELD SOLDERING TOOL

[75] Inventor: Colin John McKenzie Henry, Glen Waverley, Australia

[73] Assignee: Royel International Pty. Ltd., Doncaster, Australia

[22] Filed: Nov. 23, 1973

[21] Appl. No.: 418,654

[30] Foreign Application Priority Data
Nov. 24, 1972  Australia............................. 1347/72
Sept. 14, 1973  United Kingdom............... 43270/73

[52] U.S. Cl. ................ 219/241; 219/236; 219/499; 219/501; 219/505; 228/51
[51] Int. Cl.² ........................ H05B 1/02; B23K 3/04
[58] Field of Search .................... 219/221, 227–241, 219/501, 533, 499, 504, 505; 228/51–55

[56] References Cited
UNITED STATES PATENTS

| | | | |
|---|---|---|---|
| 3,149,224 | 9/1964 | Horme et al..................... | 219/501 X |
| 3,393,856 | 7/1968 | Fortune........................ | 219/241 UX |
| 3,456,095 | 7/1969 | Fox .............................. | 219/241 UX |
| 3,551,639 | 12/1970 | Gotley ................................ | 219/241 |
| 3,560,710 | 2/1971 | Fuellemann .................... | 219/501 X |
| 3,564,205 | 2/1971 | Tyler.............................. | 219/501 X |
| 3,646,577 | 2/1972 | Ernst................................. | 219/241 |
| 3,716,692 | 2/1973 | Schick et al........................ | 219/241 |

*Primary Examiner*—A. Bartis
*Attorney, Agent, or Firm*—Haseltine, Lake & Waters

[57] ABSTRACT

In an electrical soldering iron having a soldering tip which is heatable to a predetermined operating temperature by means of an electrical heater element and in which electrical heating and control circuits are provided to supply electric current to the heater element in response to predetermined changes in temperature of the soldering tip an electrically conducting sensing element is operatively connected with the soldering tip having a resistance which varies directly with changes in its temperature. The heating circuit has a controlled rectifier as a switch and the control circuit is adapted to regulate said controlled rectifier to open and close the heating circuit in response to a predetermined change in the resistance of the sensing element. The control circuit includes a bridge circuit in which a bias compensating diode is connected to compensate for bias of the controlled rectifier. A second diode connected in the control circuit cooperates with the bias compensating diode so as to provide for anticipation of the switch-off temperature of the SCR to thereby minimize variation in the actual soldering tip temperature for any given temperature setting.

3 Claims, 5 Drawing Figures

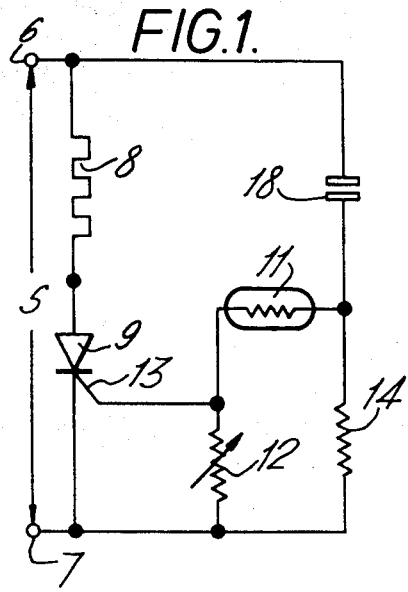
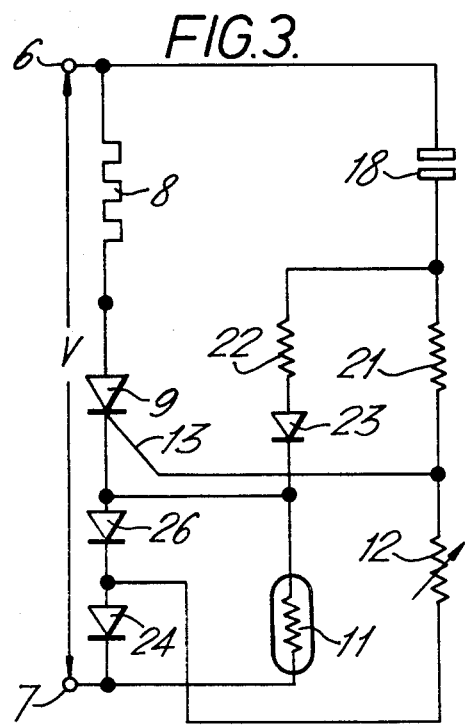
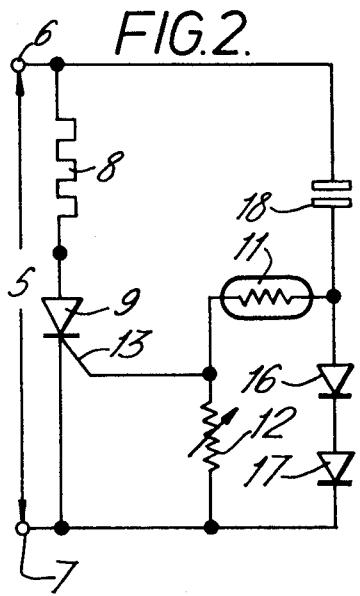
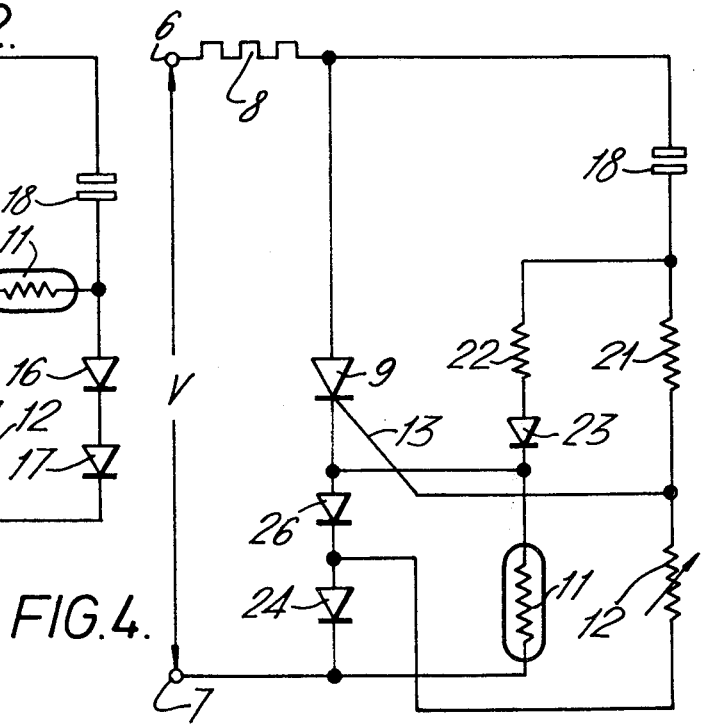

TEMPERATURE CONTROL CIRCUIT FOR A HAND HELD SOLDERING TOOL

This invention relates to a soldering iron particularly of the type suitable for soldering small components such as in miniature circuits for example circuit boards and electrical and electronic circuits in general.

A wide variety of electrically operated soldering irons are now available on the market. Generally these are heated by an electrical heating coil and may have a temperature sensing element for control of the electrical heating circuit. In known irons the electrical control for opening and closing the heating circuit is generally located in a special control box located adjacent the iron and which may provide in one main example a stand for the soldering iron when not in use. One suitable circuit and arrangement of a soldering iron is described in British Pat. application No. 5301/71 and a suitable stand is described in British design No. 957258. Generally the known control circuits employ amplifying means and other essential components such that the control circuit is of such physical dimensions as to preclude a practical arrangement where the circuit is housed in the soldering iron itself.

The object of the present invention is to provide a soldering iron in which the electrical control circuit is of such physical dimensions that it may be housed within the soldering iron itself whilst providing for satisfactory control sensitivity and reliability.

According to the present invention there is provided in an electrical soldering iron in which a soldering tip is heatable to a predetermined operating temperature to perform a soldering operation by means of an electrical heater element and in which electrical heating and control circuits are provided to supply electric current to the heater element in response to predetermined changes in temperature of said soldering tip, the improvement which comprises:

a. an electrically conducting sensing element operatively connected with said soldering tip having a resistance to current flow which increases with a rise in its temperature whereby its temperature will rise and fall and its electrical resistance will increase and decrease as the temperature of the soldering tip rises and falls;

b. said heating circuit having a controlled rectifier as a switch therein;

c. said control circuit being adapted to regulate said controlled rectifier to open and close the said heating circuit in response to a predetermined change in the resistance of said sensing element, said control circuit comprising a balanced bridge circuit a first arm of which includes said sensing element, a second arm of said bridge circuit includes a variable resistance whereby the sensing element temperatures at which the heating circuit is opened and closed may be predetermined, third and fourth arms of said circuit including resistances, the gate of said controlled rectifier being connected to the junction of the second and third arms and the cathode of said controlled rectifier being connected to the junction of said first and fourth arms whereby in response to a sufficient electrical potential imbalance across the bridge the controlled rectifier is triggered into conduction; and d. a bias compensating diode is connected between said first and second arms, the cathode thereof being connected to the first arm and to said heating circuit, the anode of said bias compensating diode being connected to said second arm and through a current limiting diode to the cathode of said controlled rectifier thereby to limit the current and to balance the bias of said controlled rectifier upon said bridge, said fourth arm including a diode to balance the effect upon the bridge of the bias compensating diode whereby heating current flowing through the controlled rectifier, bias compensating diode and current limiting diode will heat the bias compensating diode thereby lowering its voltage and providing an electrical imbalance to said bridge to lower the predetermined temperature at which the heating circuit will be opened.

Preferably a tool handle is provided which may be formed around the barrel into which the heating tip may be fitted. Preferably the tool handle is of such a shape and size that it may be readily grasped by the hand. Preferably the tool handle is a substantially elongated cylindrical handle. The handle may be made of any suitable heat resistant and electrically resistant material as is known in the art.

The present invention is concerned with the provision of unique electric heating and control circuits so as to obviate the need for a voltage amplifier at the gate of the SCR and thereby permit housing of the circuits within the soldering iron itself. Further, it will become readily apparent to persons skilled in the art that the unique arrangement of diodes 23, 24 and 26, to be hereinafter described, enables the attainment of other advantages such as control of the bias of the controlled rectifier and anticipation of the "switch-off" temperature of the controlled rectifier so as to minimize variation in the actual soldering tip temperature for any given temperature setting.

The soldering iron of the present invention includes a control circuit in which is located the heating element and a temperature sensing means above referred to. The control circuit includes power input means. Preferably the power input means is a 240 volt alternating current power input or other suitable source of alternating current electrical energy. 115v, 100v, 50v and 24v alternating current supplies have been found useful. It is to be appreciated that the circuits may be modified to adapt to direct current supply. Preferably the power leads extend from the handle and may be provided with the normal plug for coupling to a power output socket of standard form.

The control circuit is provided with switching means in series with the heating element whereby to open and close the heating circuit to the power source in response to a signal received from the temperature sensing means. Thus the switching means may be provided by a control rectifier or other suitable switch. A silicon controlled rectifier is most suitable in practice and this also provides for part wave rectification of the alternating current applied to the heating circuit. Preferably the gate of the controlled rectifier is connected to a temperature sensing circuit which contains the temperature sensing probe above referred to. The temperature sensing circuit may be provided by a voltage dividing circuit one leg of which may be provided by the resistance coil and the other leg by a variable resistance. The voltage dividing circuit may be provided in parallel with a resistance or a pair of diodes or the like between the power sources. Preferably a capacitance is provided over the power source for a purpose more fully described hereinafter.

Any suitable sensing element may be used. Nickel wire is particularly satisfactory as are nickel alloys.

In order that the invention may be more fully understood it will now be described, by way of example, with reference to the accompanying drawings in which:

FIG. 1 is a schematic diagram of an electrical circuit for a soldering iron;

FIG. 2 is a modification of the electrical control circuit shown in FIG. 1;

FIG. 3 is a schematic diagram of an electrical control circuit according to the preferred embodiment of the invention;

FIG. 4 depicts a modification of the control circuit shown in FIG. 3; and

Figure 5:
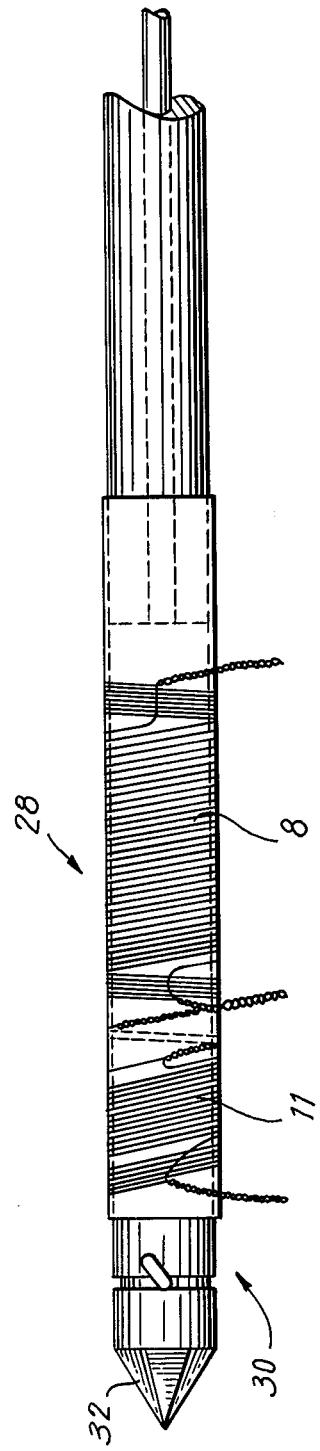
FIG. 5 is a side elevational view of part of a soldering iron incorporating the present invention.

The details of the circuits should of course not be taken as restrictive upon the ambit of the present invention. Referring to FIGS. 1 and 2 an alternating electric current is provided by a power source across the terminals 6 and 7 and a heating element 8 is connected between the terminals 6 and 7. A switching means which as shown is in the form of a silicon controlled rectifier 9 is provided in series with the heating element 8. The temperature sensing circuit includes a resistance coil 11 to provide the temperature sensing probe and the variable resistance 12 arranged to provide a voltage dividing circuit interposed by the gate 13 of the controlled rectifier 9. In FIG. 1 a resistance 14 is provided across the voltage dividing circuit. In the alternative shown in FIG. 2 a pair of diodes 16 and 17 are provided in substitution for the resistance 14. Preferably a capacitance 18 is provided between the terminal 6 and the temperature sensing circuit as shown.

The operation of the circuits shown in FIGS. 1 and 2 will be clear to those skilled in the art. When the soldering iron is required for use the resistance coil 11 will be at a low temperature and its resistance will be low also. Thus the potential difference across the variable resistance 12 will be greater than the potential drop across the resistance coil 11 so that the potential applied to the gate 13 of the controlled rectifier 9 will cause it to conduct during positive half cycles of the alternating voltage applied between the terminals 6 and 7. Thus current will flow through the heating element 8 to heat the soldering tool. As the temperature is raised the resistance of the resistance coil 11 will increase and the alternating voltage across the variable resistance 12 will be reduced until a temperature is reached such that the alternating voltage is insufficient to trigger the controlled rectifier 9. At this point current will no longer flow through the heating element 8 and the soldering iron will begin to cool. The cooling will effect a lowering of the resistance of the resistance coil 11 so that the alternating voltage across the variable resistance 12 will again begin to increase to such a stage when the controlled rectifier 9 will begin to conduct again. This sequence of operations is repeated continuously to maintain the temperature of the soldering tool at the desired level which may be adjusted by appropriate variation of the variable resistance 12. It will be appreciated that as the resistance of the variable resistance 12 is increased so the switch-off temperature for the controlled rectifier 9 will be increased to increase the temperature at which the soldering tool is maintained. An increase in the resistance 12 means that the resistance of the resistance coil 11 must be increased to a higher value (by increase in its temperature) to provide the required potential drop across the variable resistance to prevent triggering of the controlled rectifier 9.

The capacitor 18 and the resistance 14 combine to provide a suitable alternating voltage across the voltage dividing circuit formed by the resistance coil 11 and variable resistance 12. The alternating voltage applied will lead the supply voltage by approximately 90° so that the controlled rectifier 9 will switch on at a point when the instantaneous voltage across it is small. By this means electrical interference caused by the switching on and switching off of the controlled rectifier 9 is reduced to a minimum.

In the case of the circuit shown in FIG. 2 where the rectifying diodes 16 and 17 replace the resistance element 14 of FIG. 1 improved performance is provided. The voltage across the diodes 16 and 17 is dependent on temperature in the same manner as the gate voltage required to cause the silicon controlled rectifier 9 to switch on. Thus temperature compensation is provided. In addition the diodes 16 and 17 improve regulation of the alternating voltage supplied to the voltage dividing circuit comprised by the resistance coil 11 and variable resistance 12.

It will be appreciated that the circuits are relatively compact circuits and are suitable for inclusion within the soldering iron tool itself. For example the circuits above described may be included within the handle of a soldering iron. The control for the variable resistance 12 may extend from an aperture within the handle for easy adjustment by the fingers of the operator.

In alternative arrangements the temperature sensing probe and variable resistance may be included within a bridge circuit as shown in FIGS. 3 and 4. It will be appreciated that these particular circuits depicted are given by way of example only and the details should not be taken as restrictive upon the present invention. Again a heating element 8 is provided between the terminals 6 and 7 connected to the source of alternating electric current. A controlled rectifier 9 is provided in series with the heating element 8 to provide a switch therefor. The resistance coil 11 is responsive to the temperature at the soldering tip of the iron and forms part of a bridge circuit. The bridge circuit includes the resistance coil 11 in one leg and the variable resistance 12 is another. To provide the balance of the bridge there is a leg including resistance 21 and a leg including a resistance 22 and a diode 23. The controlled rectifier 9 is connected across the bridge in such a manner that its cathode is connected to the junction of the resistance coil 11 and the diode 23, whilst its gate 13 is connected to the junction of the resistance 21 and the variable resistance 12. It will be seen then that alternating voltage appearing at the gate of the silicon controlled rectifier 9 is essentially the difference between the voltage across the resistance coil 11 and the variable resistance 12. The capacitor 18 provides a supply of suitable alternating current to the bridge in phased relation for a purpose more fully described hereinafter.

A bias compensating diode 24 is provided in order to balance the bias voltage inherent in the controlled rectifier 9. The diode 23 previously described is provided in the bridge to balance the effect on the bridge of the diode 24. A diode 26 is provided to limit the current that flows in the resistance coil 11 under conditions when the silicon controlled rectifier 9 is switched on. Thus, heating current will flow through the controlled rectifier, bias compensating diode 24 and current limiting diode 26 and will serve to heat the bias compensating diode thereby lowering its voltage and providing an electrical imbalance to said bridge in order to lower the predetermined temperature at which the heating circuit will be opened. The bridge circuit is provided to ensure that variations in the alternating supply voltage across the terminals 6 and 7 do not effect substantially the temperature at which the soldering tool will be maintained, since with the bridge at balance variations in the alternating currents supplied to the bridge will have little effect on the difference voltage.

It will be noted that in FIG. 3 the capacitor 18 is connected to the terminal 6 and heating element 8 whereas in the circuit shown in FIG. 4 the capacitor is joined between the heater 8 and the controlled rectifier 9.

When the apparatus shown in FIGS. 3 and 4 is activated and the resistance of the resistance coil 11 is low due to its low temperature the alternating voltage across the variable resistance 12 in conjunction with the diode 24 in the bridge circuit will be greater than the alternating voltage across the resistance coil 11. Thus the gate voltage of the silicon controlled rectifier 9 will be sufficiently more positive with respect to the cathode voltage that the rectifier will switch on to conduct allowing the positive half cycles of current to flow through the heating element 8. The soldering iron will therefore begin to heat. The diodes 24 and 26 will prevent positive half cycles of heating current flowing through the resistance coil 11.

As the soldering iron increases in temperature the resistance of the resistance coil 11 will be increased until a temperature is reached where the difference between the gate and cathode potentials of a controlled rectifier 9 ar insufficient to allow the rectifier 9 to switch on during positive half cycles of the alternating supply voltage. Thus the flow of current through the heating element 8 will cease and the soldering iron itself will begin to cool. Thus the resistance of the resistance coil 11 will become lower and will cause the voltage difference between cathode and anode of the controlled rectifier 9 to be increased. The silicon controlled rectifier will switch on again to allow the positive half cycles of current to flow through the heating element 8 to cause the soldering tool to be heated again. During the period when the silicon controlled rectifier is switched on, the positive half cycles of the heating current flow through the diodes 26 and 24 and heat the said diodes. Since diode 24 forms part of the bridge circuit, and the heating of the diode will cause its voltage to be lowered, the difference between the gate and cathode potentials is further reduced, thus the temperature at which the rectifier ceases to switch on is lower than would be the case without the heating of diode 24.

This cycle of operations will reoccur continuously to maintain the temperature of the soldering iron within predetermined limits adjustable by means of the variable resistance 12. Increasing the resistance of the variable resistance 12 will cause the voltage at the gate of the silicon controlled rectifier 9 to be increased and so the resistance of the resistance coil 11 must be raised further before the controlled rectifier 9 will be prevented from switching on. Accordingly the temperature of the soldering tool will be maintained at a higher level.

The resistances 21 and 22 are chosen to form a suitable bridge circuit in conjunction with the variable resistance 12, the diode 24 and the resistance coil 11. The capacitance 18 is provided to supply a suitable alternating current to the bridge such that the phase angle of the current leads the phase angle of the alternating supply voltage applied to the terminals 6 and 7 by approximately 90° so that the controlled rectifier 9 will switch on when the instantaneous voltage across it is small as discussed with reference to the previous circuits. In the circuit shown in FIG. 4 the capacitance 18 is connected to the controlled rectifier 9 and the positive half cycles of voltage across the capacitor will be very low in the condition where the controlled rectifier is switched on.

Again the circuits shown with reference to FIGS. 3 and 4 may be constructed of relatively compact physical size so that they may be accommodated within the handle of a soldering iron for example.

Referring to FIG. 5, there is shown a soldering iron 28 which includes a barrel 30 and a soldering tip 32 which is cooperable with the barrel so as to be removably secured in an end thereof. The soldering tip is heatable to a predetermined operating temperature in order to perform a soldering operation. The soldering iron is provided with an electrical heater element 8 which may be wound about, but electrically insulated from barrel 30. The barrel as will be self-evident to persons versed in the art, is desirably composed of a material having a high thermal conductivity such as nickel, a nickel-copper-iron alloy or similar material. An electrically conducting sensing element 11, having a resistance to current flow which increases with a rise in its temperature, is wound about the barrel. Such sensing element, in a manner similar to the arrangement for heater element 8, is insulated electrically from the barrel. The sensing element is so associated with the soldering tip that its temperature will rise and fall, and its resistance will increase and decrease, as the temperature of the soldering tip rises and falls. A source of electrical power is provided for supplying electrical current to the heater element. FIGS. 3 and 4 may be referred to as showing terminals 6 and 7 which are connected to a source of alternating current. The circuits shown in FIGS. 3 and 4 may be embodied in the soldering iron depicted in FIG. 5 in any convenient manner and include control circuits for regulation of the heating circuit in accordance with this invention.

It will be seen then that the circuits of the present invention provide compact means for the control of heating of the soldering iron such that the circuits may be accommodated within the soldering iron itself thereby dispensing with the need for a separate control box for the iron. The invention provides a soldering iron tool including control means housed within the iron itself. It will be appreciated that various minor modifications alterations and variations may be made to the above described arrangement and construction of parts without departing from the ambit of the present invention as defined in the claims that follow.

Having now described my invention, what I claim as new and desire to secure by Letters Patent is:

1. In an electrical soldering iron in which a soldering tip is heatable to a predetermined operating temperature to perform a soldering operation by means of an electrical heater element and in which electrical heating and control circuits are provided to supply electric current to the heater element in response to predetermined changes in temperature of said soldering tip, the improvement which comprises:

a. an electrically conducting sensing element operatively connected with said soldering tip having a resistance to current flow which increases with a rise in its temperature whereby its temperature will rise and fall and its electrical resistance will increase and decrease as the temperature of the soldering tip rises and falls;

b. said heating circuit having a controlled rectifier as a switch therein;

c. said control circuit being adapted to regulate said controlled rectifier to open and close the said heating circuit in response to a predetermined change in the resistance of said sensing element, said control circuit comprising a balanced bridge circuit as a first arm of which includes said sensing element, a second arm of said bridge circuit includes a variable resistance whereby the sensing element temperatures at which the heating circuit is opened and closed may be predetermined, third and fourth arms of said circuit including resistances, the gate of said controlled rectifier being connected to the junction of the second and third arms of the cathode of said controlled rectifier being connected to the junction of said first and fourth arms whereby in response to a sufficient electrical potential imbalance across the bridge the controlled rectifier is triggered into conduction; and d. a bias compensating diode is connected between said first and second arms, the cathode thereof being connected to the first arm and to said heating circuit, the anode of said bias compensating diode being connected to said second arm and through a current limiting diode to the cathode of said controlled rectifier thereby to limit the current and to balance the bias of said controlled rectifier upon said bridge, said fourth arm including a diode to balance the effect upon the bridge of the bias compensating diode whereby heating current flowing through the controlled rectifier, bias compensating diode and current limiting diode will heat the bias compensating diode thereby lowering its voltage and providing an electrical imbalance to said bridge to lower the predetermined temperature at which the heating circuit will be opened.

2. A soldering iron as defined in claim 1, wherein a capacitance is connected in said control circuit so as to place the supply voltage out of phase with the supply current whereby said rectifier will be gated into conduction when the instantaneous voltage across same is small.

3. A soldering iron as defined in claim 2, wherein a capacitor is connected in said control circuit between the heater element and controlled rectifier.

* * * * *